United States Patent [19]

Soth

[11] Patent Number: 4,987,799
[45] Date of Patent: Jan. 29, 1991

[54] STAMPING DIE REPLICA AND METHOD OF MANUFACTURE THEREOF

[76] Inventor: Elliott Soth, 6806 Hawthorne, Cary, Ill. 60013

[21] Appl. No.: 395,972

[22] Filed: Aug. 18, 1989

[51] Int. Cl.$^5$ .................. B21D 37/20; C25D 1/10
[52] U.S. Cl. ..................... 76/107.1; 76/DIG. 6; 156/151; 156/297; 204/6; 101/28
[58] Field of Search ............... 76/107.1, 107.8, 101.1, 76/DIG. 6; 156/150, 151, 297; 204/3, 4, 6; 29/DIG. 12; 101/16, 28

[56] References Cited

U.S. PATENT DOCUMENTS

| | | |
|---|---|---|
| 3,065,511 | 11/1959 | Leitzel . |
| 3,727,489 | 4/1973 | Inoue . |
| 4,231,982 | 11/1980 | Jansson . |
| 4,579,022 | 4/1986 | Kasai et al. . |
| 4,696,722 | 9/1987 | Towlson ............................ 204/6 |

FOREIGN PATENT DOCUMENTS 0222593 12/1984 Japan ........................... 76/107.1

Primary Examiner—Roscoe V. Parker

[57] ABSTRACT

A method of making replicas of a master stamping die having a master die pattern in relief comprises first making a negative mold of the master stamping die. The mold has a negative mold cavity pattern corresponding to said master die pattern. One or more layers of die forming material is electrodeposited on the negative mold to create a replical die electroform having a cavity pattern like the mold cavity pattern. A thin electrically insulative shield is formed which has an opening pattern having generally the outline of the electroform cavity pattern. The shield is laminated on the replica die electroform with the opening pattern aligned with the electroform cavity pattern. A die material is electrodeposited into the electroform cavity pattern through the opening pattern in the shield to fill the electroform cavity pattern.

17 Claims, 1 Drawing Sheet

STAMPING DIE REPLICA AND METHOD OF MANUFACTURE THEREOF

BACKGROUND OF THE INVENTION

Field of the Invention and Prior Art

This invention concerns the replication of stamping dies of the type used for embossing book covers and the like.

It is known to replicate stamping dies by making a negative mold from a master stamping die, electrodepositing a thin plate (0.019" e.g.) of nickel, and a very thick plate of copper onto the negative mold to a condition wherein the mold cavity pattern is filled and a thick electroform is produced. The back of the electroform is then ground flat until all evidence of the cavity pattern is removed.

This prior art process is costly in that it requires an extended time for electrodeposition of the nickel and copper plates which, for example, can take as much as 40-70 hours. The extended electrodeposition process results in undesirable manufacturing costs due to extended periods of occupation of the electrodeposition bath and the excessive amount of die material, typically copper or nickel, which is required. The after-grinding process also adds to the cost of manufacture of die replicas by that known process.

Yet another approach is to create an electroform shell and to fill the shell cavities with Bakelite by capturing a Bakelite sheet between the electroform and the die back plate. That approach may be suitable to create stamping die replicas which are not intended for extended use or high temperature stamping, however, it is not suitable for high temperature operation (375 degrees F., e.g.) due to break-down of the Bakelite.

Other Prior Art

U.S. Pat. No. 3,065,511—Leitzel
U.S. Pat. No. 3,727,489—Inoue
U.S. Pat. No. 4,579,022—Kasai et al
U.S. Pat. No. 4,231,982—Jansson

OBJECTS OF THE INVENTION

It is an object of this invention to provide an improved stamping die replica and method of replicating stamping dies.

It is an object to provide an improved method of replicating stamping dies which is faster, uses less die material, is less labor and machine-time intensive and thus is less costly than prior art processes.

It is a further object to provide an improved die replica made by said process.

It is still another object to provide a durable stamping die replica suitable for long stamping runs at high stamping temperatures.

It is yet another object to provide a stamping die replication process which results in better adherence of the stamping die to the stamping die back plate.

DESCRIPTION OF THE PREFERRED MODE

Figure 1:
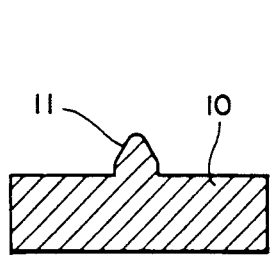
FIG. 1 illustrates in section a master stamping die to be replicated.

The process of this invention beings with a master stamping die which is typically milled from brass, magnesium, or other suitable material. A master stamping die 10 is illustrated in FIG. 1. A typical master die pattern 11 may, for example, have a die relief of 0.037"–0.047".

Figure 2:
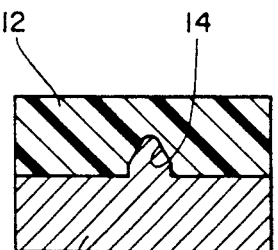
FIG. 2 illustrates in section of a negative mold of the master stamping die.

A negative mold 12 is made of the master stamping die 10 (see FIG. 2). The negative mold 12 has a cavity pattern 14 (shown here simply as a line as might be formed by the letter "I"). The negative mold 12 may be formed of Bakelite or other suitable thermosetting or thermoplastic materials. The negative mold 12 and master stamping die 10 are placed in a molding press. If Bakelite is the negative mold material, the oven temperature may, for example, be approximately 300 degrees F. The Bakelite negative mold material is pressed down upon the master stamping die 10 to form a negative mold cavity pattern 14 in the negative mold 12.

The mold cavity pattern is then coated with an electrically conductive coating, for example, a sprayed silver plating solution.

Figure 3:
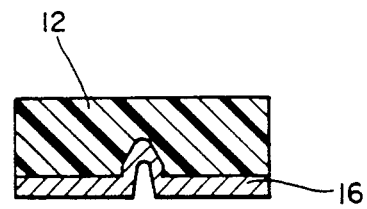
FIG. 3 illustrates the electrodeposition of an electroform on the negative mold.
Figure 4:
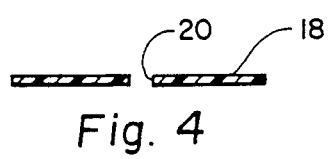
FIG. 4 shows an electrodeposition shield.

A layer of die material is then electrodeposited into the cavity pattern 14 of the negative mold 12 (see FIG. 3). The electrodeposited material may be copper, but preferably is nickel, as nickel withstands the stresses of stamping better than copper. Other suitable materials may be used. Although the thickness of the electrodeposition may vary, the process has been successfully practiced by depositing nickel for approximately 26-28 hours at 22-26 amperes per square foot, to a coating thickness of approximately 0.020". In accordance with this invention, the electrodeposition of die material is terminated at an early stage while the cavity pattern 14 is still well defined in the resulting electroform. The resultant electrodeposit or electroform 16, sometimes termed the "shell", has sufficient thickness to have the necessary mechanical integrity to withstand invention, an electrodeposition shield 18 is fabricated which will be laminated on the electroform, as will be described in detail hereinafter (see FIG. 4). Rather than electrodepositing die material for an extended period of time until the negative mold cavity pattern 14 is substantially filled and then grinding away the excess material, as in past practice, in accordance with this invention the deposition process is stopped prematurely and an electrodeposition shield 18 applied. The shield 18 prevents electrodeposition of die material except in the cavity pattern 14, thus greatly abbreviating the time and material required to form a stamping die replica having the necessary structural integrity and stamping performance capabilities.

The shield 18 may be formed of any of a variety of materials, but is preferably formed from a sheet of plastic such as acetate which may, for example, be 0.007" thick, commonly available with an adhesive film which, when heated, melts and forms a glue holding the shield in place.

In accordance with this invention there is formed in the shield 18 an opening pattern 20 having generally the outline of the cavity pattern 14 in the negative mold 12. If the lettering or other pattern on the master die is very small or narrow proper cavity fill may not always be achieved if the shield opening pattern is made to closely conform to the outline of the cavity pattern. In those cases I have found that cutting out part of the shield in the form of a square or rectangle larger than a single letter or other pattern element or a block of such elements exposes the areas surrounding the element(s) and achieves satisfactory results.

Although the opening pattern may be formed by various means, an approach used successfully in practice employs the master stamping die 10 as a cutting die to form the opening pattern 20 in the shield 18. This may be accomplished, e.g., by placing the shield material (preferably acetate) and adhesive film on the master stamping die 10, backing the shield 18 with a 0.18" thick paper board, and pressing the shield material against the die 10 for approximately 1-2 seconds at approximately 600 psi in a 175-200 degree F. oven.

Figure 5:
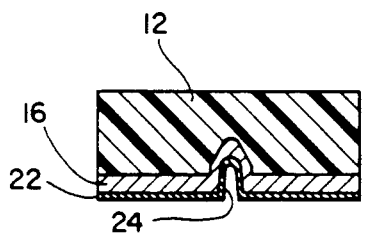
FIG. 5 illustrates the electrodeposition of a preparatory shield adherence layer on the electroform.

As a preparation for the application of the shield 18, in order to better adhere the shield 18 to the electroform 16, the electroform is rinsed and there is electrodeposited on the electroform a thin plate 22 of copper—for example, 0.003"-0.007" (see FIG. 5). The copper plating time may, for example, be three hours at 100 amperes per square foot.

Any excess of electrodeposited material (nickel and/or copper in this instance) is then cleaned off and the shield laminated to the electroformed product.

Figure 6:
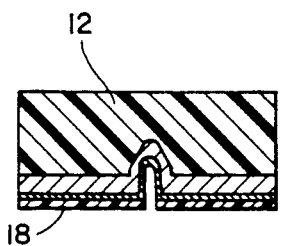
FIG. 6 shows the shield laminated to the electroform.

The next step is to laminate the shield 18 on the electroform 16 with the shield opening pattern 20 in registry with the cavity pattern 14 in the negative mold 12. This may be achieved by placing the shield 18 on the electroform 16 with the opening pattern 20 in registry with the cavity pattern 24 in the electroform 16. The shield 18 is backed by two layers of 0.18" paper board and pressed with a hot press at 200-250 degrees F. for 5-10 minutes to adhere the shield 18 intimately to the electroform 16 (see FIG. 6). The shield covers all areas of the electroform 18 except the cavity pattern 14 and in some cases enclosed regions within the cavity pattern (for example, the island within the letter "O").

Figure 7:
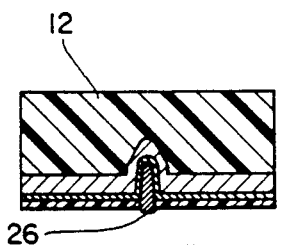
FIG. 7 illustrates the electroform with its cavity pattern filled.

The electroform is then placed in an electroplating copper bath. Depending on the width and size of the cavities (0.37" relief lettering, for example) a plating time of 15-22 hours may be employed (see FIG. 7). Although not crucial, I have found that if the plating is carried out for two hours at 50 amperes and then increased to 100 amperes for the remainder of the 15-22 hour period, successful results are achieved. By filling only the cavity pattern 24 in an electroform of minimum acceptable thickness, substantial overall costs are saved due to reduced deposition time and material.

Figure 8:
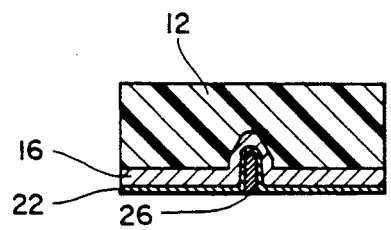
FIG. 8 shows the filled electroform after post grinding.
Figure 9:
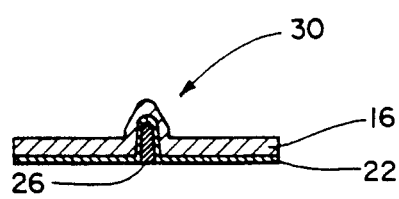
FIG. 9 illustrates the resultant die replica (filled electroform).

As a result of the plating, there will inevitably be excess copper deposited around the boundaries of the cavity fill 26 in the electroform 18. This excess can be controlled, to a degree, by adjusting the pulsing of the electroplating current through the bath. The excess is removed, as by milling or grinding (see FIG. 8).

Figure 10:
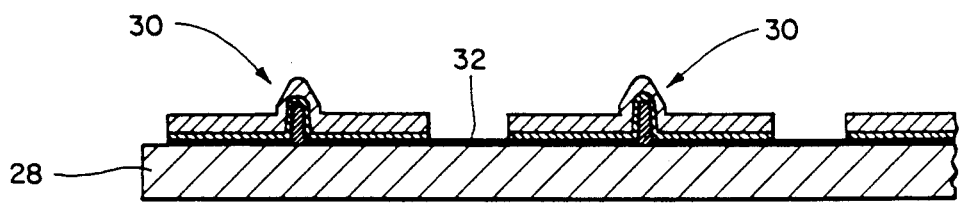
FIG. 10 shows part of a stamping back plate with a plurality of die replicas secured thereto

It is not important that the shield 18 be completely removed or even that it be removed at all. I have found that when the end product filled electroform is cemented to to a stamping back plate (FIG. 10) with the shield in place, better adherence of the stamping die replica to the backing plate is achieved than if the shield is removed, for the reason to be explained hereafter. Hence, all that need be achieved by the after processing is to remove the excess of electrodeposited material to provide a flat surface for attachment of the stamping die replica 30 (filled electroform) to the stamping back plate 28.

The stamping die replica 30 is then cemented to back plate 28. The back plate is typically composed of 0.187" (3/16") brass. The replica 30 may be cemented to the stamping back plate 28 by use of a layer 32 of acetone-based rubber adhesive impregnating a 0.005" copper, aluminum or steel spacer screen. The acetone in the cement at least partially dissolves the acetate shield, furthering the union of the replica 30 and the back plate 28. The final step is to remove the negative mold 12. It is common in the final operation to create a stamping die assembly comprising, for example, eighteen stamping die replicas 30 adhered to a common stamping back plate 28.

Whereas a preferred method and replica embodiment have been described, there are other method steps and materials which may be employed in accordance with the principles of this invention. For example, whereas Bakelite may be employed for the negative mold, other suitable thermoplastic or thermosetting materials may be utilized. As stated, I prefer an electroform composed of a nickel layer followed by a thin copper plate promoting adherence of the shield, however, various other structures and materials may be employed which are suitable for electrodeposition and which will result in an end product stamping die replica having properties suitable for stamping. Whereas acetate is preferred for the shield, various other materials may be employed, so long as they are not electrically conductive and can be intimately adhered to the electroform. The final electrodeposition to fill the cavities is preferably of copper, but could be of nickel or other suitable material.

Other method steps and replica embodiments are therefore within the scope of this invention and are embraced by the claims to follow

What is claimed is:

1. A method of making replicas of a master stamping die having a master die pattern in relief, comprising:
    making a negative mold of said master stamping die having a negative mold cavity pattern corresponding to said master die pattern;
    electrodepositing one or more layers of die forming material on said negative mold to create a replica die electroform having a cavity pattern like said mold cavity pattern;
    making a thin electrically insulative shield having an opening pattern having generally the outline of said electroform cavity pattern;
    laminating said shield on said replica die electroform, with said opening pattern aligned with said electroform cavity pattern; and
    electrodepositing a die material into said electroform cavity pattern through said opening pattern in said shield to fill said electroform cavity pattern.

2. The method defined by claim 1 wherein said shield comprises a thin sheet of plastic material and an adhesive film.

3. The method defined by claim 2 wherein said shield is composed of acetate.

4. The method defined by claim 3 wherein said acetate shield and film has a thickness of approximately 9 mils.

5. The method defined by claim 1 wherein prior to laminating said shield, a preparatory layer of copper is electrodeposited on said replica die electroform to promote adherence of said shield to said electroform.

6. The method defined by claim 5 wherein said replica die electroform includes a first layer of nickel followed by said preparatory layer of copper.

7. A method of making replicas of a master stamping die having a master die pattern in relief, comprising:
   making a negative mold of said master stamping die having a negative mold cavity pattern corresponding to said master die pattern;
   electrodepositing a layer of die-forming material on said negative mold to create a replica die electroform having a cavity pattern like said mold cavity pattern;
   electrodepositing on said electroform a very thin preparatory shield adherence layer;
   making a thin electrically insulative shield having an opening pattern having generally the outline of said electroform cavity pattern;
   laminating said shield on said replica die electroform with said opening pattern aligned with said electroform cavity pattern; and
   electrodepositing a die material into said cavity pattern through s id opening pattern in said shield to fill said electroform cavity pattern.

8. The method defined by claim 7 wherein said shield is composed of acetate and an adhesive film and said preparatory layer is composed of a thin layer of copper which promotes adherence of said shield to said electroform.

9. The method defined by claim 8 wherein said acetate shield and film has a thickness of about 0.009" and said preparatory layer of copper is about 0.003-0.007" thick.

10. A method of making replicas of a master stamping die having a master die pattern in relief, comprising;
    making a negative mold of said master stamping die having a negative mold cavity pattern corresponding to said master die pattern;
    electrodepositing one or more layers of die forming material on said negative mold to create a replica die electroform having a cavity pattern like said mold cavity pattern;
    using said master stamping die as a cutting die, cutting from a thin sheet of electrically insulative material a shield having an opening pattern having generally the outline of said electroform cavity pattern;
    laminating said shield on said replica die electroform, with said opening pattern aligned with said electroform cavity pattern; and
    electrodepositing a die material into said electroform cavity pattern through said opening pattern in said shield to fill said electroform cavity pattern.

11. The method defined by claim 10 wherein said shield is composed of a thin sheet of acetate and an adhesive film.

12. A method of making replicas of a master stamping die having a master die pattern in relief, comprising:
    making a negative mold of said master stamping die having a negative mold cavity pattern corresponding to said master die pattern;
    electrodepositing a layer of nickel die-forming material on said negative mold to create a replica die electroform having a cavity pattern like said mold cavity pattern;
    electrodepositing on said electroform a 0.003" to 0.007" thick preparatory shield adherence layer of copper;
    using the master stamping die as a cutting die, cutting from a thin sheet of acetate a shield having an opening pattern having generally the outline of said electroform cavity pattern;
    laminating said shield on said replica die electroform with said opening pattern aligned with said electroform cavity pattern;
    electrodepositing copper into said cavity pattern through said opening pattern in said shield to fill said electroform cavity pattern; and
    milling or grinding away any excess copper fill.

13. An in-process article of manufacture developed during the replication of a master stamping die having a master die pattern, comprising:
    a negative mold of the master stamping die having a cavity pattern corresponding to said master die pattern;
    a replica die electroform comprising an electrodeposit of one or more layers of die forming material on said negative mold;
    an electrically insulative shield having an opening pattern generally outlining said cavity pattern of said negative mold as replicated in said electroform, said shield being laminated on said electroform with said opening pattern aligned with said cavity pattern in said electroform; and
    an electrodeposit of die material in said cavity pattern in said electroform.

14. The article defined by claim 13 wherein said electrically insulative shield comprising a thin sheet of plastic material and an adhesive film.

15. The article defined by claim 14 wherein said shield is composed of acetate.

16. The article defined by claim 14 wherein said electroform is composed of a primary layer of nickel followed by a thin plating of copper to promote adherence of said shield.

17. The article defined by claim 13 wherein said electrodeposit of material into said cavity pattern in said electroform is composed of copper.

* * * * *